United States Patent [19]
van der Wal

[11] Patent Number: 5,417,539
[45] Date of Patent: May 23, 1995

[54] TRANSPORTATION TRAILER FOR A MODULAR HOME UNIT

[75] Inventor: Jurjen van der Wal, Costa Mesa, Calif.

[73] Assignee: Jurjen van der Wal, Revocable Family Trust, Costa Mesa, Calif.

[21] Appl. No.: 95,534

[22] Filed: Jul. 26, 1993

[51] Int. Cl.⁶ .............................................. B60P 3/00
[52] U.S. Cl. .................................. 414/458; 180/906; 280/401; 280/483; 280/484; 280/495
[58] Field of Search ............... 414/495, 498, 458, 471, 414/482–485; 280/401; 180/906

[56] References Cited

U.S. PATENT DOCUMENTS

| | | | |
|---|---|---|---|
| 2,897,989 | 8/1959 | Hounsell | 414/458 |
| 3,743,120 | 7/1973 | Schmidt | 414/495 |
| 3,780,894 | 12/1973 | Holmes et al. | 414/485 |
| 3,967,743 | 7/1976 | Yoder | 414/458 |
| 4,491,452 | 1/1985 | Mostovich | 414/458 X |
| 4,699,558 | 10/1987 | Hagge et al. | 414/458 |
| 4,772,038 | 9/1988 | MacDonald | 280/401 |
| 4,792,272 | 12/1988 | Oswald et al. | 414/458 |
| 4,934,893 | 6/1990 | Johnson | 414/458 |
| 5,074,733 | 12/1991 | Hennig | 414/495 X |
| 5,288,197 | 2/1994 | Harris | 414/482 X |

FOREIGN PATENT DOCUMENTS

| | | | |
|---|---|---|---|
| 2391091 | 1/1979 | France | 414/495 |
| 2205495 | 8/1973 | Germany | 414/458 |
| 541205 | 11/1941 | United Kingdom | 414/482 |

*Primary Examiner*—David A. Bucci
*Attorney, Agent, or Firm*—James G. O'Neill

[57] ABSTRACT

A trailer for lifting and transporting large loads is constructed of a pair of elongated side trusses, adjustably connected together at their ends by structural frames, and having a plurality of lifter frames rotatably and slidably mounted on the elongated side trusses. A first of the end structural frames is secured to a hitch assembly for pulling the trailer and this first structural frame as well as each of the elongated side trusses is provided with a mechanical lifting device to separately move the same. A pair of chassis having wheels for moving the trailer are connected to the mechanical lifting devices, under the elongated side trusses, and are separately connected to the hitch assembly by tow rods.

20 Claims, 3 Drawing Sheets

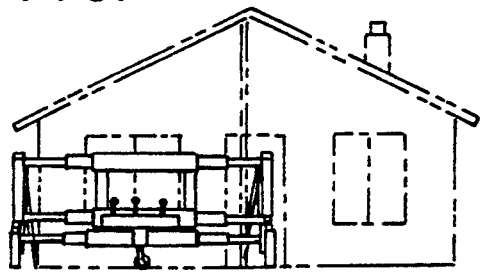
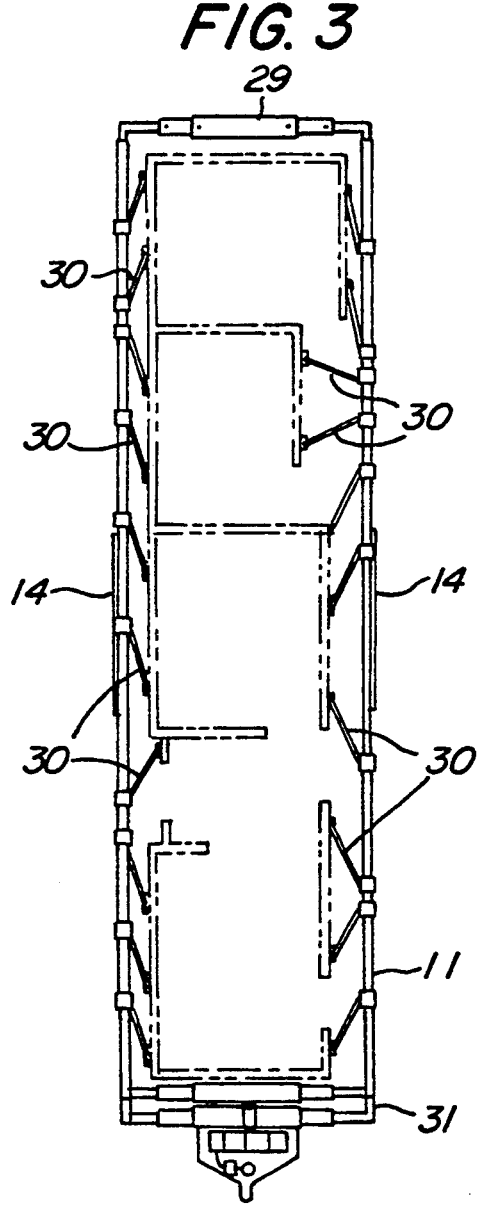
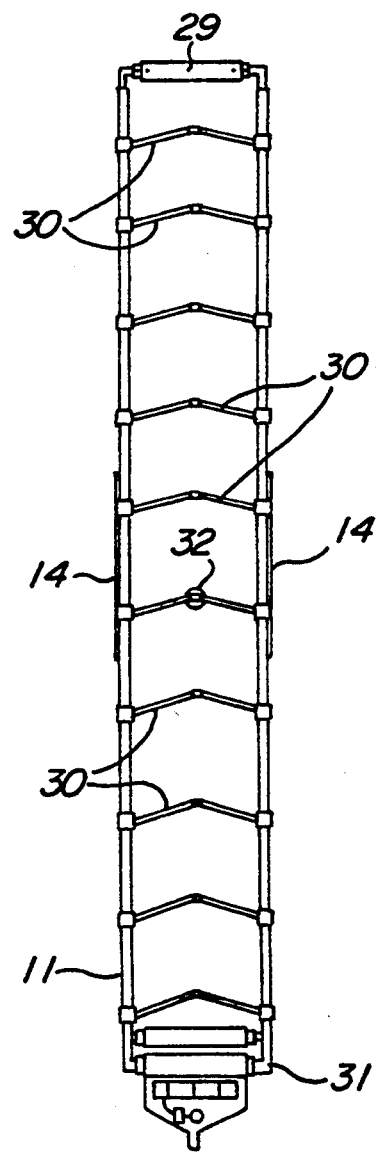

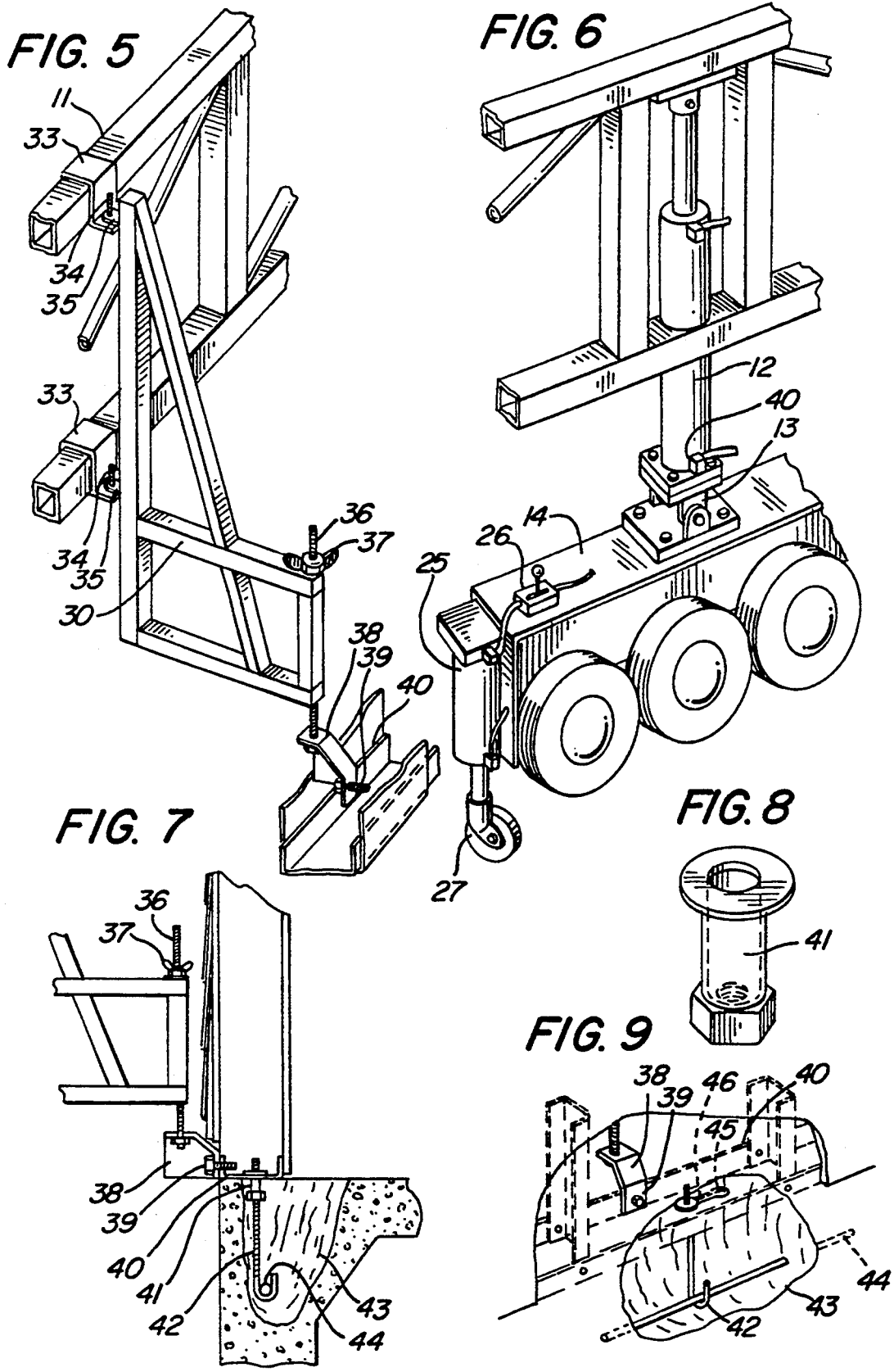

TRANSPORTATION TRAILER FOR A MODULAR HOME UNIT

BACKGROUND OF THE INVENTION

The present invention relates to a trailer mounted transporter system for a factory built manufactured home that is built without a floor, whereby this house is transported from the factory to its permanent home site by a pair of structural trusses on wheels, whereby these trusses serve as the support for a number of lifting frames which are equipped with suitable means for being made to attach externally to the walls of the home or portion of the home, with the added provision that these lifting devices which surround the home and which have been united with detachable crossbars into a single rectangular trailer-like entity can be pulled on the highway by a tow truck.

PRIOR ART

Numerous efforts have been made in the 20th Century to provide low-cost housing for those who have limited financial means. By standardizing designs into interchangeable parts it was possible by some builders to achieve worthwhile economics of scale, but even then the cost of such a home was still prohibitive for many potential buyers.

Builders and architects have also seriously attempted to build modular housing, which is basically a concept in which separate wall sections are built in a factory, and these sections are then later assembled at the home site. This method has a very limited use at this time. Yet another method is the so called Mobile Home, which initially started out as being a camper, but then increased in size, and 30 years ago it became quite popular, and still is, because of its low cost. These homes on wheels in the beginning were of a single width, about 12 feet wide, and mounted on a chassis that was anywhere from 20 to 60 feet long, whereby two or three closely spaced axles with wheels, under the center of the trailer, completed the trailer-like structure, so that it could be towed.

Soon thereafter the double-wide mobile home was developed, which consisted of two single-wides that were united at the home site. At present there are many socalled Mobile Home Parks with hundreds of these mobile homes in them, which are mostly occupied by elderly people. A drawback of these mobile homes has always been the fact that the axles and wheels are still part of these mobile homes even after these homes have been installed at their final location. Piers support the carriage structure at many strategically chosen places so that the floor of the mobile home will be level. Special skirting is usually installed below the home around its perimeter in order to conceal this unattractive pier support system as well as the wheels. A big drawback of such a mobile home installation is the fact that the floor of this mobile home is about three feet above the ground, which requires the installation of a stair-like structure, with up to five steps and a handrail, which often poses big problems for elderly people, to the extent that the inexpensive mobile home that they bought as their last home, becomes later inaccessable because the aging process has made them less ambulatory to a point that they can't climb the stairs anymore.

Eventually, the earlier building components of these mobile homes, such as aluminum siding and sheeted interior wall paneling, have been replaced by interior and exterior walls that are now structurally identical to walls of conventional site-built homes. On the inside the cheap looking paneling was replaced by sheetrock, also known as drywall, and the exterior of the walls is now often made of shiplap type planking.

The next step in the development process was to eliminate the three feet high elevation of the mobile home above the ground, and this was done by digging a mobile home size pit of about 2½ feet deep, whereby simultaneously a so called stemwall foundation was built to support the exterior walls of the mobile home. The home thus became attached to the ground, and it is now said in the industry to sit on a 'permanent foundation'. To accomplish this, the trailer as to be driven in the pit, the home is then jacked up so that its wheels and axles can be removed, and then the home is lowered so that its exterior wall comes to rest on the stemwall, while the interior floor portions are supported by adjustable piers, just like a conventional mobile home. Cable bracing from the stemwall to the mobile home's floor, at about a 45 degree angle, provides some protection to keep the mobile home in its place in case of an earthquake. This type of home is in the industry now called a 'Manufactured Home' to distinguish it from a standard mobile home.

It is clear from the foregoing description that the transportation of the mobile home is of major importance. The wheels, axles and undercarriage are indispensible components of the manufactured housing industry, and one of its biggest disadvantages is that the floor of the home on wheels is 3 feet above the ground. These 3 feet are a very real loss, because the top of the roof of a manufactured home on wheels needs to pass during its transport under highway overpasses, elevated crossings, powerlines and telephone cables. This restriction very much limits the height of manufactured homes and forces many of them to have a roof that is lower than is aesthetically pleasing, and often makes them somewhat look like the less attractive box-like old fashioned mobile homes with their low profile roofs from which they evolved.

To resolve this 'lower than desirable' situation it is clear that the home's framed floor with thereunder its undercarriage and wheels need to be eliminated. The following are some samples of lifting devices which lift cabins or containers without the benefit of an undercarriage:

Erich Mai, U.S. Pat. No. 4,147,267 discloses equipment for lifting and depositing cabins, shelters, replacement constructions and the like which attaches itself to the sides rather than to the bottom of the cabin that is to be lifted. However, the lifting device is stationary, not fitted with wheels and not suitable for homes or cabins with varying floor plans, and it also is not suitable for transporting its lifted load.

Reinhold Riedl, U.S. Pat. No. 4,619,439 discloses a lifting and depositing device for portable containers, compartments, shelters and the like, in which the lifting is accomplished by hand powered rackjacks which are attached to the container corners by means of crossbars.

Generally it can be observed that the lifting and/or transporting methodology is acutely tuned to the manner or location in which the lifted object needs to be deposited, and the present invention makes no exception to that.

Once a portion of a manufactured home has been built in the factory, it needs to be transported over public roads to its permanent homesite. In California there are legal limits in force which define a maximum trailer length of 66'-8", and a maximum trailer width of 14'-0". Because of a roof overhang which usually is about 2 feet on a side of a home, it has become fairly customary that a 14 feet wide trailer width became the standard.

The following dimensions are common in the industry:

A single width home is about 12–14 feet wide.
A double width home is about 24–28 feet wide.
A triple width home is about 38–42 feet wide.

DESCRIPTION OF THE INVENTION

The actual purpose of this invention is to make the manufactured home resemble a site-built home as much as possible, and to reduce its cost. With that in mind it was possible to find a solution, which was to do away with the manufactured home's floor and its undercarriage and its axles and wheels, while simultaneously eliminating the 2½ feet deep excavation under the home at its permanent site. This was accomplished by devising a new way in which the manufactured home without a floor is being lifted up and held up during its transport from the factory to the homesite, where a conventional concrete floor slab is ready and waiting for the home.

Using a double-wide manufactured home as an example which is split in two approximately equal halves vertically through its longitudinal roof beam, it is clear that we must be able to deal with each of the halves independently. With the absence of a floor it is now actually the roof with its joists, braces, beams and plywood sheeting that provides the unification, the strength and the coherance between the exterior walls and the many interior walls and partitions.

In order to accomplish the transport of a home with a roof but without a floor it became necessary to incorporate two special design features into this factory built home:

First: The floor plate, which is the horizontal structural member at the bottom of a wall where it sits on the concrete floor, needs to be equipped at regular intervals, just above the floor, with a steel nut that is suitable to receive the horizontal bolt of a lifting device.

Second: The home must have a door opening at its end that is halfway between its left and right exterior walls, so that a truss-like lifting mechanism on wheels can enter the home and penetrate it for the full depth of the home so that its pivoting lifting arms with fasteners may connect to the floor plates of the interior walls of the home. The pivoting lifting arms of the structural truss that is outside the home are connected in a similar manner to the floor plates of the exterior walls.

These two supporting trusses with their many pivoting lifting arms are connected at the front of the house where the door opening is, and this cross connecting frame is equipped with a hydraulic cylinder that connects it to the trailer hitch structure. The left and right multiple wheel assemblies under the trusses are with long extensions reaching the front of the house where they are by means of a telescoping cross connection united with the trailer hitch structure mentioned above.

When all lift arms are bolted to the floor plates of the walls, this half of the house is then lifted of the ground so that its transport may start. This lifting is accomplished by means of hydraulic cylinders of which one is placed at the center of each of the two structural trusses, while a third hydraulic cylinder is lifting the cross connecting frame between the trusses at the front, above the trailer hitch. This third hydraulic cylinder also controls the forward and backward pitch of the lifted house. The hydraulic power unit for all of these cylinders is located on the trailer hitch connector plate, where a single operator can control all three lifts with all the appropriate valves mounted on a single console. The electrical power for the hydraulic pump unit is provided by a power supply on the tow truck.

These hydraulic Cylinders may be substituted by mechanical or electrical lifting devices, or any combination thereof.

Once the lifted up house has been rolled several feet away from its initial location, a removable truss connector frame can then be installed and locked in at the back end of the house-lifting trusses, so that now a rectangular lifting and transporting structure has been formed that will keep its wheels tracking and trailing the tow truck in a true and controlled manner.

The Highway Patrol in the State of California permits the transport on public roads of such manufactured houses, provided that the trailoring vehicle with the house is not longer than 66'-8" and not wider than 14'-0". Because of its excessive width this tow truck with trailer assembly must be preceeded by a pilot car with a flashing light. If the width of such a trailer is less then 8"-0" then a pilot car with a flashing light is not required, and it is for that reason that the front and rear cross connector frames between the two structural trusses of this transporter have been given the capability of telescoping in and out, so that its narrowest width is less than 8'-0"when empty, which thus eliminates the need and expense of a lead car and its driver for the return trip.

When the tow truck with its house arrives at the homesite where the pre-constructed concrete slab for the house is waiting, then the house is driven directly over and above its final destination, where it is then lowered carefully by the three hydraulic cylinders on its final resting place, and the house lifter connectors are then disconnected.

If for some reason the house, when it is lowered, is not exactly where it is supposed to be, then the three hydraulic trailer lifts with swivel wheels which are located in rear of the wheels of the leftside truss, and in the rear of-the wheels of the rightside truss, and at the trailer hitch, may be extended down to the extent that the entire trailer is lifted up so that it is only supported by these three lifts on their swivel wheels, and the house can then pushed in any direction so as to be matched with its exact desired location on the concrete slab.

At preplanned multiple locations, halfway under the wall, the concrete slab has openings in it that expose the steel reinforcing bars in the concrete. These bars serve as the anchor for the J-bolts with special extended nuts with a flange which can be inserted from the hole in the concrete below into a slotted hole in the floor plate of the wall, which is then secured to the floor by tightening the nut and filling the hole in the floor with concrete.

DESCRIPTION OF THE DRAWINGS

FIG. 2 shows in phantom the two halves of a 'double-wide' home, of which one side is being prepared for lifting.

FIG. 3 is a plan view of the transportation system which is loaded with one half of a house, which demonstrates the versatility of the pivoting lifter arms which can slide lengthwise along its supporting truss for best position.

FIG. 4 shows the narrowest configuration of the house transporter when it is empty.

FIG. 5 is a detail of the sliding and pivoting lifter arm.

FIG. 6 shows the structural truss with the hydraulic cylinder on its supporting base with its tilting mechanism. Also shown is one of the three trailer lifting hoists which in this figure is standing on its swivel wheel.

FIG. 7 is a cross section of the lower part of the wall of the house with an anchor bolt already connected.

FIG. 8 is an extended anchor nut with flange.

FIG. 9 depicts the concrete floor and the handhole in the concrete floor for the installation and tightening of the anchor bolt.

DETAILED DESCRIPTION OF THE PREFERRED EMBODIMENT

Figure 1:
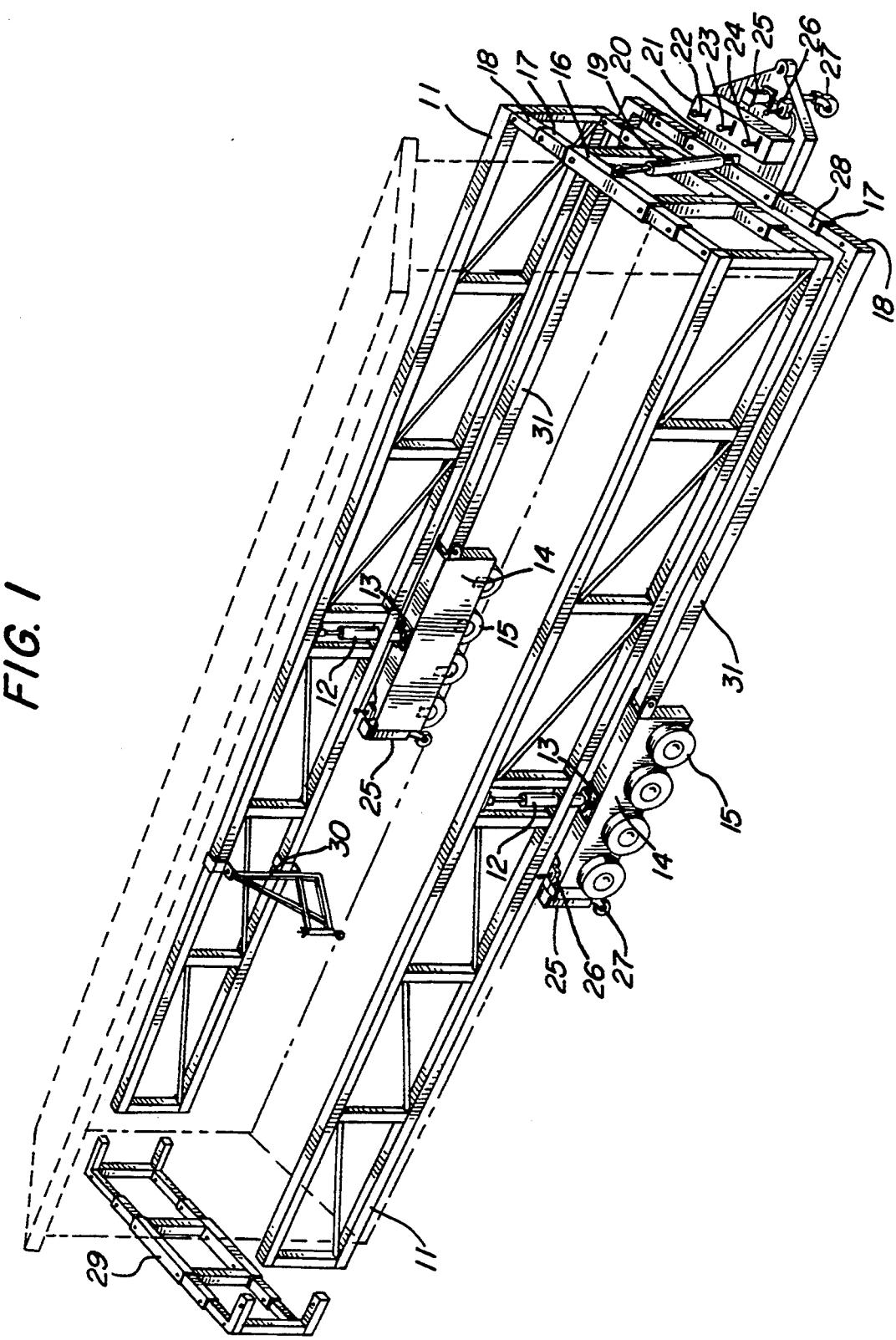
FIG. 1 is a complete assembly of the transportation system of the house on its trailer, in which the house which is shown in phantom lines in its lifted up position, is surrounded by its rectangular lifting framework, of which its rear cross connecter frame is shown in its detached position, whereby both the front and the rear cross connector frames show their telescoping capabilities. The relative positions of all hydraulic cylinders are shown, as well as their control stations. Only one of the pivoting lifter frames is shown, for clarity.

Referring to FIG. 1, this is a composite drawing of the transportation trailer which is carrying a home. This transporter consists of two identical but opposite structural trusses 11, each of which can be raised or lowered by an hydraulic cylinder 12 which is mounted on a pivoting base plate 13, which in turn is placed on top of chassis 14, which is the structural member that supports the wheels 15.

The front ends of the two trusses 11 are connected by a cross-connecting frame 16 by means of large telescoping members 17 on each side as well as above and below, and smaller telescoping members 18 are sliding inside members 17. Central crossframe member 16 is by means of hydraulic cylinder 19 connected to trailer hitch assembly 20 on which hydraulic pump unit 21 with its three control handles is mounted, of which handle 22 controls the leftsided hydraulic cylinder 12, handle 23 controls front center hydraulic cylinder 19 and handle 24 controls the rightsided hydraulic cylinder 12. Hydraulic fluid connecting lines are not shown.

Hydraulic trailer lift 25 with its individual control 26 and swivel wheel 27 is attached to the trailer hitch assembly, and identical lifts are also installed at the rear of the leftside and rightside wheel chassis 14 respectively. Locking pin 28 that interlocks the two telescoping tubes 17 and 18 is typical for all locking pins in all telescoping assemblies of this design.

Rear crossconnecting frame 29 has four forward extensions that can slip into and out of the open back ends of truss 11, and this crossconnector needs to be removable so that the trailer can be driven away from the house after it has been deposited on its foundation. The left to right telescoping members and the locking pins of this crossconnector are identical to its front end counterparts 17, 18 and 28 respectively.

For clarity, only one single pivoting lifter frame 30 is shown FIG. 1, even though each structural truss 11 may support a dozen or more of such devices.

Left and right hinged towbars 31 connect the wheel chassis 14 with hitch assembly 20 via telescoping members 18 and 17.

FIG. 2 shows in elevation how the house transportation trailer is able to enter one half of the house through an open door, while the other side of the transporter is outside the house. FIG. 3 is a plan view of the house carrier trailer as it surrounds one half of the house. In this view towbars 31 are directly below trusses 11. The important pivoting feature of house lifters 30 permits easy attachment to a variety of walls that are at different distances from structural trusses 11.

FIG. 4 depicts how on the empty return trip, in the narrow trailer configuration, each pair of two opposing house lifters may be tied together with a chain 32 at the trailer centerline so as to keep them from slamming back and forth.

Truss 11 in FIG. 5 serves as support for hooks 33 which are slidable along truss 11, and which are equipped with pins 34 which serve as pivot points for hinges 35 which in turn are attached to the main frame of pivoting lifter arm 30. A threaded suspension rod 36 is held at the top by large wingnut 37, and this rod at its lower end is equipped with a loose fitting bracket 38 that may be bolted with steel bolt 39 to floorplate member 40 of the wall of the house that is to be transported. The equal tightening of all wingnuts 37 at all lifter arms 30 of the house transporter trailer will ensure that all of the hangers will be carrying a load so that the house will be transported with an appropriate distribution of the load.

In FIG. 6 hydraulic cylinder 12 at the center of truss 11 transfers its thrust to the center of the upper longitudinal truss beam of truss 11, whereby this hydraulic cylinder is kept in perfect alignment by passing through the center of the lower longitudinal truss beam. Hydraulic connectors 40 provide the hydraulic fluid supply, its hydraulic circuits are not shown.

Bracket 38 of FIG. 7 is by means of bolt 39 attached to floorplate 40 of the house. After the house has been deposited in its proper place at its permanent site, then the floorplate of the wall is firmly secured to the concrete floor by tightening special elongated nut 41 of FIG. 8 onto J-bolt 42.

In FIG. 9 handhole 43 in the concrete floor exposes concrete reinforcing bar 44, so that J-bolt 42 can easily be hooked onto it, while the J-bolt, with its special flanged nut 41 already on it, can readily be inserted through floorplate hole 45 which provides access to slotted plate support 46 for the flange of the nut. Once in place, nut 41 can then be tightened on the J-bolt with a wrench, and the house is thus secured on its foundation. Thereafter the hole in the concrete floor is filled flush with concrete. This invention in its broader aspects is not limited to the specific combinations, improvements and instrumentalities described, and departures may be made therefrom within the scope of the accompanying claims without departing from the principles of the invention and without sacrificing its chief advantages.

That which is claimed is:

1. A trailer assembly for carrying a large load, comprising, in combination;
    first and second elongated side trusses; each of said first and second elongated trusses having a front end and a back end and including a top member, a bottom member and a plurality of strengthening members connecting and supporting said top and bottom members;

a first adjustable end frame adjustably connecting said front ends of said first and second elongated side trusses together, and a second adjustable end frame adjustably connecting said back ends of said first and second elongated side trusses together;

an adjustable open central area formed between said first and second elongated side trusses and said first and second adjustable end frames;

said first adjustable end frame being permanently held in said front ends of said first and second elongated side trusses and said second adjustable end frame being removably held in said back ends of said first and second elongated side trusses, whereby said large load may be inserted into and removed from between said back ends of said first and second elongated side trusses into said open central area, when said second adjustable end frame is removed;

a plurality of lifter frames rotatably and slidably mounted on said first and second elongated side trusses and extending into said open central area; each of the plurality of lifter frames having securing means thereon for adjustably securing said lifter frames to said large load so as to provide individual load lifting points to support said large load in said open central area;

a chassis means having a plurality of wheels thereon mounted under and supporting each of said elongated side trusses;

a hitch means secured to said first telescoping end frame; and separate tow bar means connected between said chassis means and said hitch means whereby said trailer may be pulled by said hitch means.

2. The trailer assembly of claim 1 wherein said trailer includes a pair of frames connected together by a plurality of mechanical devices for moving said pair of frames relative to each other.

3. The trailer assembly of claim 2 wherein a first of said pair of frames is a trailer portion and is comprised of said separate tow bar means, said chassis means and said hitch means.

4. The trailer assembly of claim 2 wherein said separate tow bar means are hingedly connected to said chassis means and are further connected to telescoping means which are connected to said hitch means.

5. The trailer assembly of claim 2 wherein the second of said pair of frames is a load carrying frame and is comprised of said first and second elongated side trusses and said first and second adjustable end frames.

6. The trailer assembly of claim 2 wherein said plurality of mechanical devices for moving said pair of frames relative to each other are comprised of hydraulic means connected between said chassis means and said first and second elongated side trusses, and said hitch means and said first adjustable end frame.

7. The trailer assembly of claim 6 wherein said hydraulic means connected between said chassis means and said first and second elongated side trusses are fixedly secured to said top members of said first and second elongated side trusses and secured by pivoting means to said chassis means.

8. The trailer assembly of claim 7 wherein said hydraulic means connected between said hitch means and said first adjustable end frame is capable of moving one of said pair of frames about pivoting means secured to said chassis means.

9. The trailer assembly of claim 1, further including a plurality of swivel wheels adjustably held to said chassis means and said hitch means, whereby upon adjustment of said plurality of swivel wheels said trailer may be lifted off any surface upon which it is resting.

10. The trailer assembly of claim 9 wherein there are three swivel wheels and these three swivel wheels are adjusted by hydraulic means connected thereto.

11. The trailer assembly of claim 1 wherein said plurality of lifter frames are rigid non-flexible elements having inner ends slidably mounted on said elongated side trusses and outer ends to which said securing means are attached.

12. The trailer assembly of claim 11 wherein said securing means of said plurality of lifter frames include load lifting tensioning means that permit individual pre-tensioning of the load burden at each individual load lifting point.

13. A trailer assembly for carrying a large load, comprising, in combination;

a first frame comprising a trailer portion having a chassis means with a plurality of wheels thereon, a hitch means and a pair of tow bar means connected between said chassis means and said hitch means;

a second frame comprising a load carrying frame having first and second elongated side trusses and first and second telescoping end frames secured together and supported by said chassis means of said first frame mounted under and supporting said first and second elongated side trusses; each of said first and second elongated trusses having a front end and a back end and including a top member, a bottom member and a plurality of strengthening members connecting and supporting said top and bottom members;

an adjustable open central area formed between said first and second elongated side trusses and said first and second telescoping end frames;

the first telescoping end frame being permanently held in said front ends of said first and second elongated side trusses and the second telescoping end frame being removably held in said back ends of said first and second elongated side trusses, whereby said large load may be inserted between said back ends of said first and second elongated side trusses into an open central area formed therebetween, when said second telescoping end frame is removed; and a plurality of lifter frames rotatably and slidably mounted on said first and second elongated side trusses and extending into said open central area; each of the plurality of lifter frames being rigid, non-flexible members having securing means on an outer end thereof for adjustably securing said lifter frames to said large load so as to support said large load in said open central area.

14. The trailer assembly of claim 13 wherein said separate tow bar means are hingedly connected to said chassis means and are further connected to telescoping means which are connected to said hitch means.

15. The trailer assembly of claim 14, further including a plurality of hydraulic cylinders for moving said first frame and second frame relative to each other, and said hydraulic cylinders are connected between said chassis means and said first and second elongated side trusses, and said hitch means and said first telescoping end frame.

16. The trailer assembly of claim 15 wherein the hydraulic cylinders connected between said chassis means and said first and second elongated side trusses are fixedly secured to said top members of said first and second elongated side trusses and secured by pivoting means to said chassis means.

17. The trailer assembly of claim 16 wherein the hydraulic cylinder connected between said hitch means and said first telescoping end frame is capable of moving said second frame about said pivoting means secured to said chassis means.

18. The trailer assembly of claim 13, further including a plurality of swivel wheels adjustably held to said chassis means and said hitch means and including hydraulic actuating means, whereby upon actuation of said hydraulic actuating means said plurality of swivel wheels will raise said trailer assembly above any surface upon which it is resting.

19. The trailer assembly of claim 13 wherein said plurality of lifter frames are rigid, non-flexible elements having inner ends slidably mounted on said elongated side trusses and outer ends to which said securing means are attached, and said securing means of said plurality of lifter frames include load lifting tensioning means that permit individual pre-tensioning of the load burden supported by each lifter frame.

20. A trailer assembly for carrying a large load, comprising, in combination;
first and second elongated side trusses; each of said first and second elongated trusses having a front end and a back end and including a top member, a bottom member and a plurality of strengthening members connecting and supporting said top and bottom members;
a first telescoping end frame adjustably connecting said front ends of said first and second elongated side trusses together, and a second telescoping end frame adjustably connecting said back ends of said first and second elongated side trusses together;
an adjustable open central area formed between said first and second elongated side trusses and said first and second telescoping end frames;
said first telescoping end frame being permanently held in said front ends of said first and second elongated side trusses and said second telescoping end frame being removably held in said back ends of said first and second elongated side trusses, whereby said large load may be inserted between said back ends of said first and second elongated side trusses into said open central area, when said second telescoping end frame is removed;
a plurality of lifter frames rotatably and slidably mounted on said elongated side trusses and extending into said open central area; each of the plurality of lifter frames being a rigid non-flexible element having inner ends slidably mounted on said elongated side trusses and outer ends having securing means attached thereto; and said securing means including load lifting tensioning means that permit individual pretensioning of the load burden at each individual load lifting point;
a chassis having a plurality of wheels thereon mounted under and supporting each of said first and second elongated side trusses;
a hitch means, including separate telescoping means, connected to said telescoping end frame;
separate tow bars hingedly connected to said chassis means and connected to said hitch means whereby said trailer may be pulled by said hitch means;
said trailer including a pair of frames connected together by a plurality of hydraulic cylinders for moving said pair of frames relative to each other; a first of said pair of frames being a trailer portion comprised of said separate tow bar means, said chassis means and said hitch means; a second of said pair of frames being a load carrying frame comprised of said first and second elongated side trusses and said first and second telescoping end frames;
one of said plurality of hydraulic cylinders connected between said hitch means and said first telescoping end frame and capable of moving said second frame about pivoting means secured to said chassis; and
a plurality of swivel wheels adjustably held to said chassis means and said hitch means and including hydraulic actuating means to move said plurality of swivel wheels so that said trailer may be lifted off any surface upon which it is resting.

* * * * *